Jan. 26, 1954
E. M. BOWEN
2,667,091
BORING MACHINE
Filed Sept. 19, 1951
5 Sheets-Sheet 1
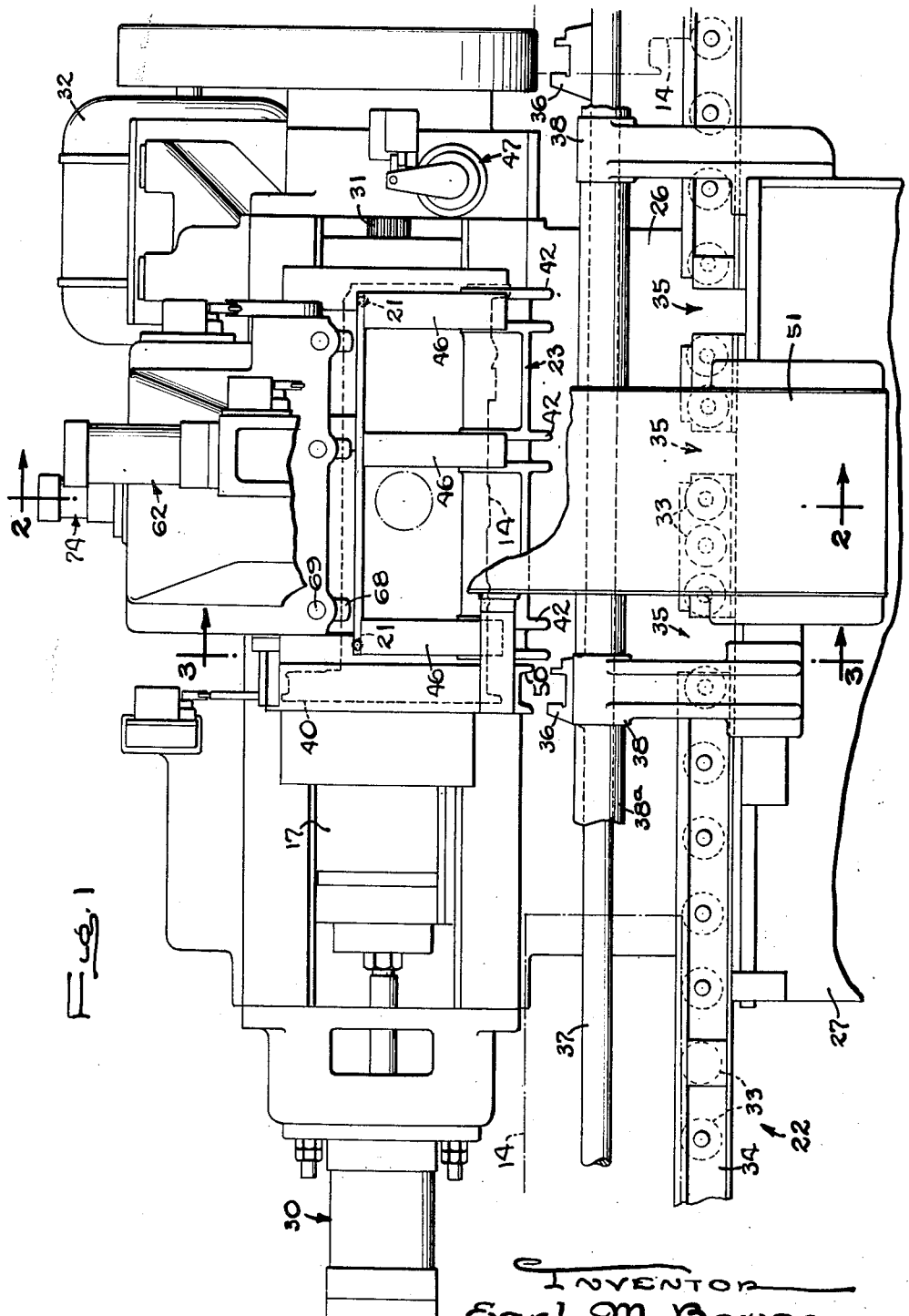
INVENTOR
Earl M. Bowen
By Carlson, Pitzner, Hubbard & Wolfe
ATTORNEY

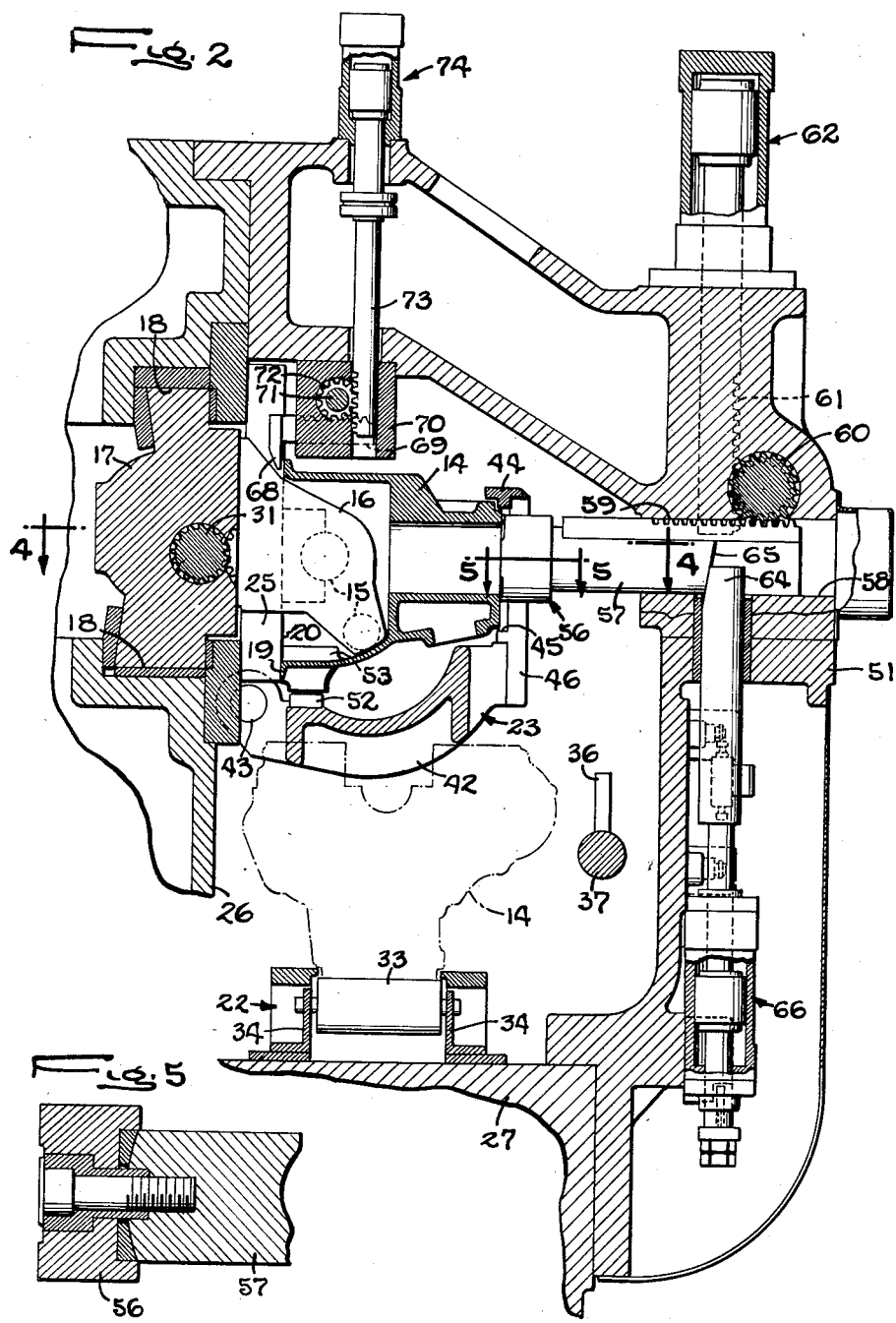

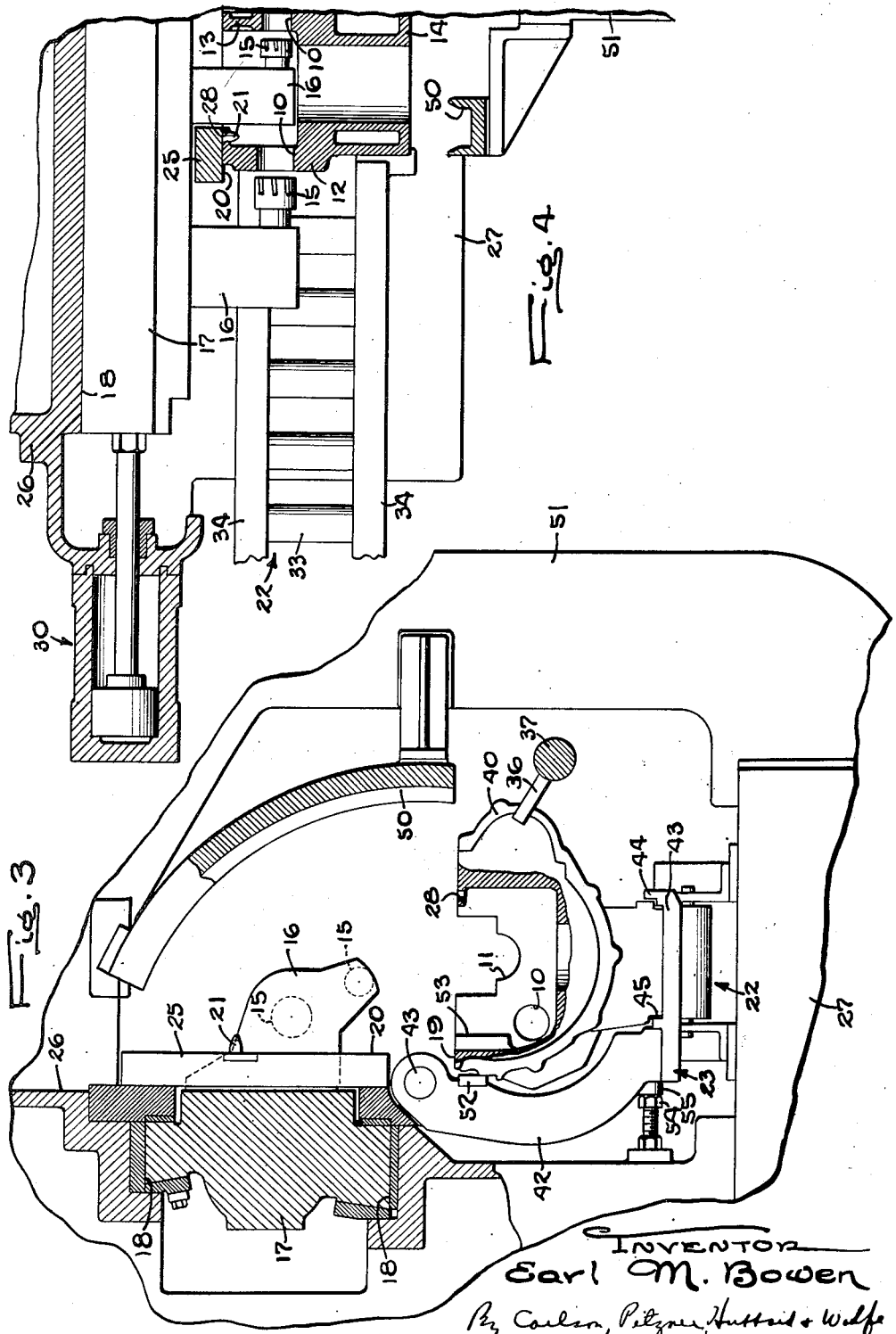

Jan. 26, 1954   E. M. BOWEN   2,667,091
BORING MACHINE
Filed Sept. 19, 1951   5 Sheets-Sheet 4
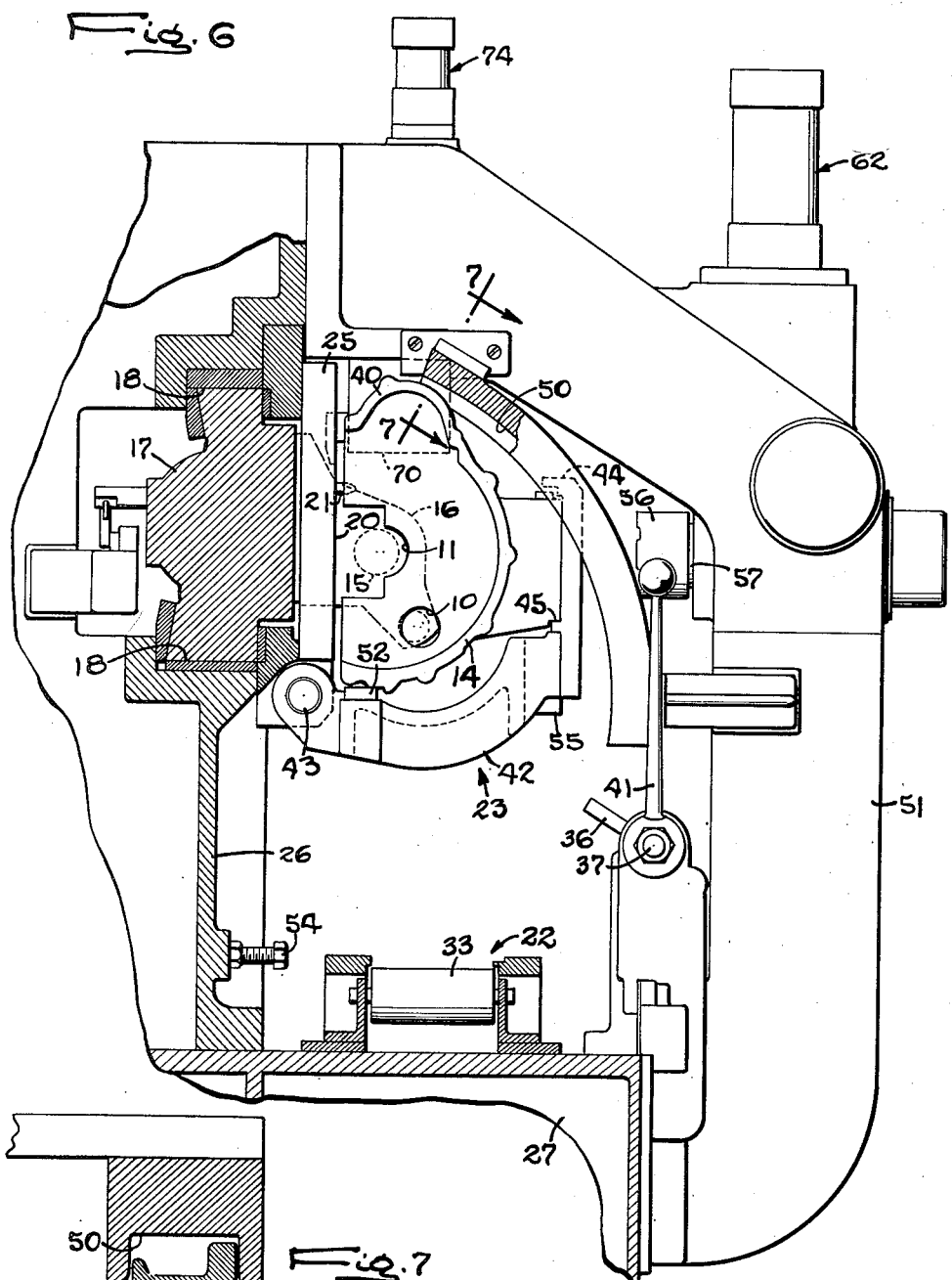
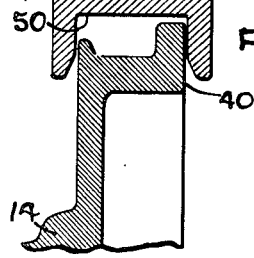
INVENTOR
Earl M. Bowen
By Carlson, Pitzner, Hubbard Wolfe
ATTORNEY

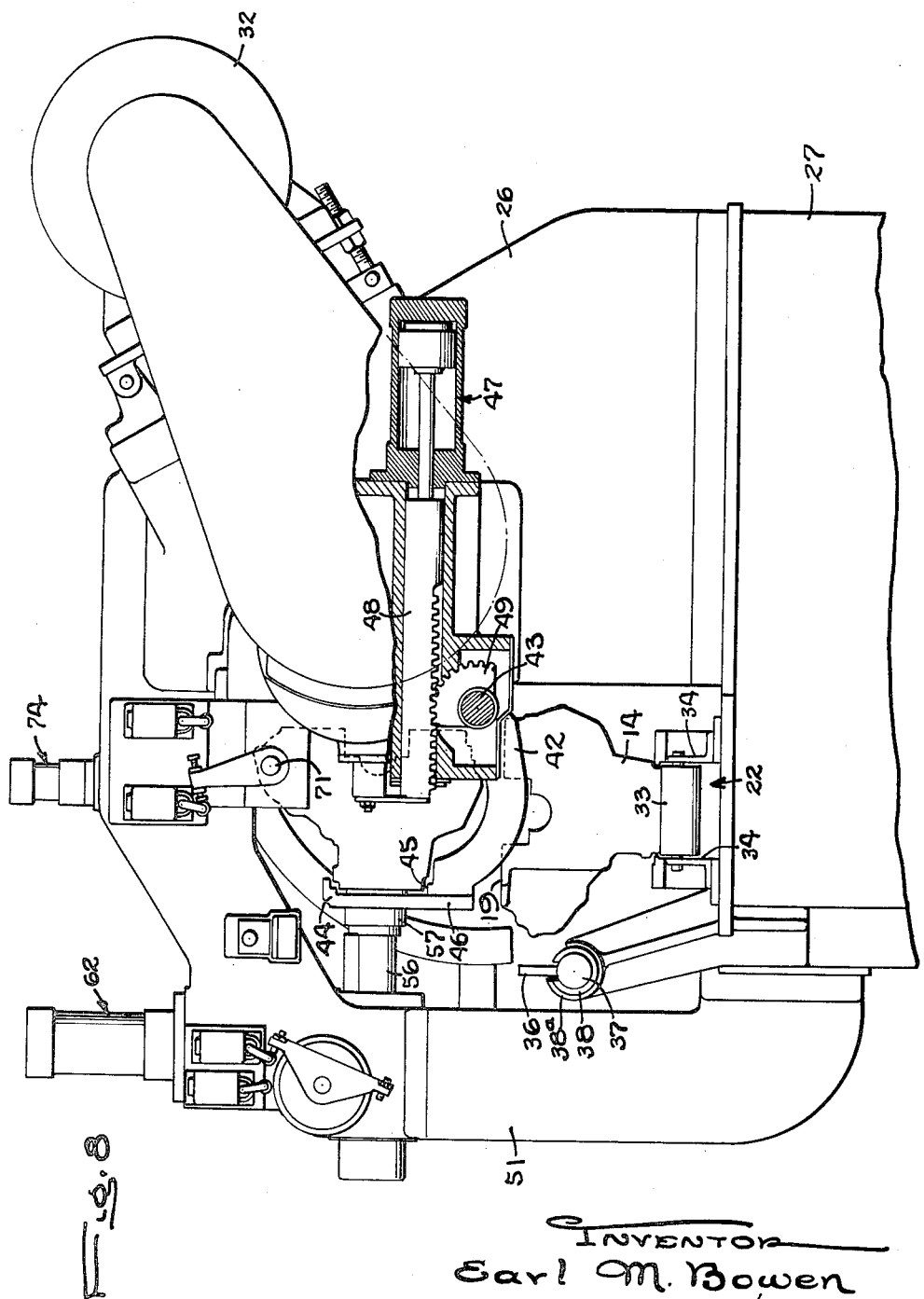

Patented Jan. 26, 1954

2,667,091

UNITED STATES PATENT OFFICE 2,667,091

BORING MACHINE

Earl M. Bowen, Rockford, Ill., assignor to The Ingersoll Milling Machine Company, Rockford, Ill., a corporation of Illinois Application September 19, 1951, Serial No. 247,252

9 Claims. (Cl. 77—3)

This invention relates to machine tools for boring holes in the interior of an open sided workpiece, particularly wherein the workpiece is fitted over a tool support projecting from a locating surface against which the piece is clamped and held while being machined.

The general object is to provide a machine tool of the above character in which the tools and the various power actuators are exposed or readily accessible for replacement or service, which provides an extremely rigid mounting for the workpiece being machined, and which is adapted to operate on interior parts of the workpiece which heretofore have been inaccessible.

Another object is to provide a boring machine having a horizontally facing locating surface and a fixture swingable through a quarter revolution to transfer a workpiece from a horizontal conveyor to an operating position against said surface and straddling the tool supports projecting therefrom.

A further object is to provide in a swinging fixture machine of the above character for accurate location of the workpiece by rigid dowel elements projecting from the locating surface.

The invention also resides in the novel manner of guiding the workpiece during its transfer into and out of operating position, and in bringing the piece into and out of engagement with the locating dowels.

Figure 1 is a side elevational view of a boring machine embodying the novel features of the present invention, certain of the parts being broken away.

Figs. 2 and 3 are fragmentary sectional views taken along the lines 2—2 and 3—3 of Fig. 1.

Figs. 4 and 5 are fragmentary sectional views taken along the lines 4—4 and 5—5 of Fig. 2.

Fig. 6 is a fragmentary section similar to Fig. 3 but showing the workpiece in a different position.

Fig. 7 is a fragmentary section taken along the line 7—7 of Fig. 6.

Fig. 8 is a fragmentary end view.

For purposes of illustration, the invention is incorporated in a machine tool for boring the camshaft holes 10 (Figs. 3 and 4) and halves of the crankshaft holes 11 in the end walls 12 and crosswebs 13 of the block 14 of an internal combustion engine. The boring is effected by rotary cutters 15 journaled on and projecting laterally from the sides of arms 16 projecting rigidly and in the proper laterally spaced relation from an elongated slide 17 guided for endwise movement along ways 18 rigidly supported on the machine frame. Preparatory to machining, the open-sided workpiece or block is fitted over the tool supports and with the crank case flange 19 thereof pressed firmly against a rigid locating surface or abutment 20 from which projects two dowel pins 21 by which the workpiece is positioned laterally with the desired accuracy in the final movement of the piece toward the locating abutment. This general method of locating an engine block and boring the cam and crankshaft recesses therein is utilized in the machine shown in Patent 2,010,157.

In the improved machine incorporating the present invention, the locating surface 20 faces horizontally, and the workpieces 14 are advanced open side up along a horizontal conveyor 22 into a swingable fixture 23 disposed below and in front of the locating surface (Fig. 3). As the fixture is swung upwardly and turned through a quarter revolution, the workpiece is raised and the open side thereof is presented opposite the locating surface (Fig. 6) after which the piece is pushed a short distance relative to the fixture and onto the dowels 21 to effect final positioning and clamping of the piece against the surface 20 (Fig. 2). While the piece is so held, the slide 17 is fed endwise to bore the holes and then rapidly returned to permit release of the machined piece and return of the latter to the fixture by which it is swung downwardly, returned to the conveyor, and later advanced out of the way during the transfer of the succeeding piece into the fixture.

The horizontally facing locating surfaces 20 are formed on horizontally spaced bars 25 secured against the front of a rigid column 26 upstanding from one side of a base 27. Two dowels 21 tapered at their ends project rigidly from opposite ends of the bars 25 and are adapted to enter holes 28 (Figs. 3 and 4) formed along one side of the crank case flange 19 of the workpiece in a precise relation with respect to the various surfaces to be machined on the piece. The guides 18 for the tool slide are also formed in the front of the column 26 which supports a hydraulic actuator 30 (Fig. 4) whose piston rod is connected to one end of the slide. The tool supporting arms 16 are bolted to the exposed face of the slide 17 and house spur gear trains by which the cutters are driven from a spline shaft 31 journaled on the slide 17 and driven from a motor 32.

Rollers 33 spaced along and rotatably supported between two bars 34 fastened to the top of the base 27 form the horizontal conveyor 22 which is interrupted at 35 (Fig. 1) to receive parts of the swinging fixture 23. The workpieces open side up on the rollers as shown in Fig. 3 are advanced step by step along the conveyor rollers by arms 36 projecting rigidly and laterally from a bar 37 which is journaled in stationary bearings 38 for endwise sliding and also for angular movement to carry the arms 36 into and out of overlapping relation with respect to flanges 40 projecting outwardly from bulges in the side of the workpieces. For this purpose, the ends of the arms are forked as shown in Fig. 1 to straddle the workpiece flange 40. A handle 41 (Fig. 6) rigid with one end of the bar may be utilized to turn and shift the transfer bar 37 between limits determined by the width and length of a longitudinally extending slot in a shield 38ᵃ surrounding the transfer bar.

The fixture 23 comprises a cradle of substantially right angular L-shaped cross section having one leg 42 fast on a rockshaft 43 pivoted on the front of the column 26 adjacent the lower edge of the slide 17 and beneath the lower ends of the locating bars 25. When hanging downwardly as shown in Fig. 3, the cradle leg 42 curves around the near side of a workpiece and its free end is joined rigidly to laterally spaced bars 46 which are disposed in the interruptions 35 of the conveyor 22 and thus underlie a workpiece supported thereon. The bars 46 are connected at their free ends by a flange 44 which cooperates with a shoulder 45 to center the workpiece laterally on the cradle as the latter starts to swing upwardly to lift the workpiece from the conveyor.

Such upward swinging of the cradle is effected in this instance by a hydraulic actuator 47 (Fig. 8) having a cylinder mounted on one side of the column 26 and its piston rod connected to a rack 48 meshing with the teeth of a gear segment 49 fast on one end of the rockshaft. In the initial upward movement of the cradle and the workpiece thereon, the flange 40 of the workpiece enters an arcuate guide channel 50 (Figs. 1, 3, and 6) mounted on the inner face of a bracket 51 extending upwardly from the base 27 around the fixture and connected at its upper end to the top of the column 26.

The lowered position of the fixture is determined accurately by an adjustable stop 54 (Fig. 3) projecting from the column 26 and engageable with a boss 55 at the heel of the cradle leg 42. As determined by the length of the cylinder of the actuator 47, the cradle is swung from the lowered position upwardly along the guide 50 and substantially through a quarter revolution thus presenting the open side of the casting opposite the locating surfaces 20 but with the crank case flange 29 spaced from these surfaces a distance less than the length of the dowel pins 21. In the upward swinging, the workpiece shifts slightly in the fixture and against the shoulder 45 and pads 52 secured to the cradle legs 42 adjacent the pivot 43 thereof. The pads 52 engage bosses at opposite ends of the workpiece and are positioned so as to aline the holes 28 in the workpiece with the dowel pins 21 and allow the latter to partially enter the holes in the final part of the upward fixture motion.

In the latter part of the fixture motion, the several recesses in the open side of the casting are fitted over the corresponding tool projections 16 which, as shown in Fig. 6, project well into the casting. Since the casting is presented to the tool supports in an arcuate movement, it is possible to bring tools in behind an obstruction such as that indicated at 53 (Fig. 2) which would preclude proper entry of the tools by a straight line motion between the casting and the tool support.

Final accurate positioning of the workpiece and clamping thereof are effected by a power actuated pusher 56 (Figs. 1, 2, and 5) mounted for limited universal swiveling on the end of a rod 57 and engageable with the flat head end of the cylinder block 14 substantially at the center of this end so that the clamping force will be evenly distributed. Herein, the rod 57 is keyed and slidable horizontally in a hole 58 in the bracket 51 and carries rack teeth 59 which through gears 60 journaled on the bracket move with a rack bar 61 slidable vertically in the bracket. At its upper end, the bar 61 carries the piston of a hydraulic actuator 62 by which the pusher may be shifted forwardly to shift the casting and press it against the locating surfaces 20 or retracted to the position shown in Fig. 6 out of the path of the swingable fixture. During shifting of the casting by the pusher, the dowel pins 21 act in a well known manner to locate the casting laterally before it engages the locating surfaces 20. By this cam action of the dowels, the casting is lifted clear of the pads 52 and the shoulder 45.

To clamp the workpiece rigidly against the locating surfaces, a wedge 64 (Fig. 2) is projected upwardly and across an inclined surface 65 formed on the pusher rod 57. The wedge is guided in the bracket 51 and adapted to be raised and lowered by a hydraulic actuator 66 also mounted on the bracket. It will be seen that the wedging force is applied to the casting through the medium of the pusher 57 which becomes firmly locked when the wedge is advanced as shown in Fig. 2.

With the workpiece thus positioned accurately as shown in Figs. 2 and 4, all of the holes 10 and 11 will be bored in the proper positions simply by feeding the tool slide 17 to the right as viewed in Fig. 4. After rapid retraction of the slide, the machined workpiece is returned to the conveyor by releasing and retracting the clamp 56, stripping the piece off from the dowels 21 and onto the surfaces 45 and 52 of the fixture 23 which may then be swung downwardly. Herein, the stripping is effected by three fingers 68 (Figs. 1 and 2) on the ends of rack bars 69 slidable horizontally in a block 70 rigid with the bracket 51. The rack teeth mesh with gears on a shaft 71 carrying a gear 72 which meshes with the teeth on the piston rod 73 of a hydraulic actuator 74.

Normally, the fingers 68 are disposed adjacent but spaced somewhat from the upper edge of the crank case flange of the workpiece clamped against the locating surfaces 20. As the rod 73 is projected downwardly, the fingers 68 are moved forwardly and outwardly beyond the surfaces 20 thus engaging the workpiece and shifting it off from the dowel pins. The piece is thus gradually lowered onto the pads 52 and the shoulders 45 and is thus positioned in the fixture for swinging of the later downwardly to again bring the piece to the level of the conveyor rollers 33.

By swinging the handle 41 counterclockwise to the position shown in Fig. 6, the arms 36 may be brought into engagement with the workpieces spaced along the conveyor including the previously machined piece positioned in the fixture 23. By shifting the handle and the rod 37 endwise and to the right as viewed in Fig. 1, the machined piece is transferred out of the fixture and a new piece moved therein ready for transfer, by upward swinging of the fixture, into machining position against the surfaces 20.

The various parts of the work transfer, locating, and machining cycle as described above may be executed automatically in the proper sequence by employing well known control circuits governing the energization of solenoid valves to admit pressure fluid at proper times to the various actuators 30, 47, 62, 66, and 74. The circuits are controlled by the various switches shown in the drawings and arranged to be operated at opposite limits of the movements of the various machine parts.

It will be apparent from the foregoing that the tools 15 and their supports are well exposed at the front of the column 26 and that the various moving parts of the fixture, the conveyor, the work clamp as well as their power actuators are readily accessible without dismantling the machine. Replacement of the cutters and servicing of the entire machine may thus be accomplished conveniently and at low cost.

I claim as my invention:

1. In a boring machine, the combination of, a frame, a horizontally facing locating surface on said frame having dowels projecting from the surface, a support projecting from said surface and adapted to support a boring tool, a horizontal pivot disposed below and paralleling said locating surface, a cradle of L-shaped cross section having one leg suspended from said pivot and a second leg projecting horizontally away from said surface, a horizontal conveyor by which an opensided workpiece may be supported open side up and moved to a position above said second leg, means for swinging said cradle outwardly and upwardly about said pivot to pick a workpiece from said conveyor, turn the same through a quarter revolution, and present the piece opposite said surface and said dowels with said tool support projecting into the workpiece opening, an arcuate guideway on said frame engaging the workpiece during upward swinging thereof to hold the workpiece against endwise movement, and a pusher mounted on said frame and movable relative thereto into engagement with the elevated workpiece to push the same onto said dowels and against said locating surface.

2. In a boring machine, the combination of, a frame, a horizontally facing locating surface rigid with said frame and having dowels projecting therefrom, a support projecting from said surface and adapted to support a boring tool, a horizontal pivot disposed below and paralleling said locating surface adjacent the plane of the later, a cradle of L-shaped cross section having one leg suspended from said pivot and a second leg projecting away from said surface, a conveyor by which an opensided workpiece may be supported open sideup and moved to a position above said second cradle leg, means for swinging said cradle upwardly about said pivot to pick a workpiece from said conveyor, turn the same through a quarter revolution, and present the piece opposite said surface and in partial engagement with said dowels and with said tool support projecting into the workpiece opening, and a member movable relative to said cradle and engageable with the elevated workpiece to push the same further onto said dowels and against said locating surface.

3. In a boring machine, the combination of, a frame, a horizontally facing locating surface rigid with said frame and having dowels projecting therefrom, a tool carrier projecting from said surface, a horizontal pivot disposed below and paralleling said locating surface adjacent the lower edge of the latter, a support in front of said surface onto which an open-topped workpiece may be moved open top up, an L-shaped cradle having one leg swingable on said pivot and a second leg adapted to underlie a workpiece on said support when the cradle is in a lowered position, means on said first cradle leg for engaging the adjacent side of the workpiece so as to underlie the latter and prevent substantial tilting of the piece relative to the cradle as the latter is swung upwardly and away from said lowered position, means for swinging said cradle upwardly about said pivot to pick a workpiece from said support, turn the same through a quarter revolution, and present the piece opposite said surface and said dowels with said tool carrier projecting into the top opening of the workpiece, and power actuated means for shifting the elevated workpiece in said cradle to push the same onto said dowels and clamp the piece against said locating surface.

4. In a boring machine, the combination of, a frame, a horizontally facing locating surface rigid with said frame, a tool carrier projecting from said surface, a horizontal pivot disposed below and paralleling said locating surface, a support in front of said surface for receiving an opensided workpiece having dowel holes in the open side thereof, a cradle swingable on said pivot and having a leg adapted to underlie a workpiece on said support, means for swinging said cradle upwardly to pick a workpiece from said support, turn the same through a quarter revolution, and present the piece to a predetermined position adjacent to said surface with said tool support projecting into the workpiece opening, dowels projecting from said locating surface and extending partially into said holes when the workpiece is in said predetermined position, and a power actuated means for shifting the elevated workpiece in said cradle to push the same onto said dowels and press the piece against said locating surface.

5. In a boring machine, the combination of, a frame, a horizontally facing locating abutment rigid with said frame, a horizontal pivot disposed below and adjacent said abutment, a work support on said frame in front of said abutment, an L-shaped cradle having one leg suspended from said pivot and adapted to underlie and support a workpiece when in horizontal position, said cradle having a second leg adapted to underlie a workpiece on said support when said first leg is in upright position, means for swinging said cradle upwardly about said pivot to pick a workpiece from said support, turn the same through a quarter revolution, and present the piece opposite said abutment but short of the latter, means on said first cradle leg engaging and supporting the workpiece during upward swinging thereof, means for shifting the elevated workpiece relative to said cradle and against said obutment, and means engageable with the elevated workpiece and acting during shifting thereof by said last mentioned means to shift the piece laterally and locate the same in a predetermined position against said abutment.

6. In a boring machine, the combination of, a frame, a horizontally facing locating abutment rigid with said frame, a horizontal pivot disposed below and adjacent said abutment, a work support on said frame in front of said abutment, an L-shaped cradle having one leg suspended from said pivot and a second leg adapted to underlie a workpiece disposed on said support with its top surface exposed, means for swinging said cradle upwardly about said pivot to pick a workpiece from said support, turn the same through a quarter revolution, and present said top surface opposite said abutment but short of the latter, means on said first cradle leg engaging and supporting the workpiece during upward swinging thereof while the bottom side of the piece remains adjacent said second leg, a guide slidably engaging the workpiece to hold the same against endwise movement during said upward swinging, a power actuated means for shifting the elevated workpiece horizontally relative to said cradle to press the piece against said abutment, and a boring tool mounted on said frame to operate on a predetermined part of the workpiece while the latter is engaging said abutment.

7. In a boring machine, the combination of, a frame, a locating abutment rigid with said frame and disposed in a substantially vertical plane, a horizontal pivot disposed below and adjacent said abutment, a work support on said frame in front of said abutment, an L-shaped cradle having one leg suspended from said pivot and a second leg adapted to underlie a workpiece on said support, means for swinging said cradle upwardly about said pivot to pick a workpiece from said support, turn the same through a quarter revolution, and present the piece opposite said abutment but short of the latter, means on said first cradle leg engaging a side of the workpiece and supporting the workpiece during upward swinging thereof whereby to prevent substantial tilting, and means for shifting the elevated workpiece relative to said cradle and against said abutment.

8. In a boring machine, the combination of, a frame, means thereon defining a horizontally facing stationary locating abutment, a pusher spaced from said abutment and mounted on said frame for movement toward and away from the abutment to press a workpiece against the latter, a member adapted to receive and support a workpiece in a horizontal position below said abutment and between the latter and said pusher, means supporting said member to swing upwardly about a horizontal axis and carry the supported workpiece from said horizontal position upwardly and laterally past said pusher to an upright position adjacent to and spaced from said abutment, means on said member releasably supporting the workpiece during upward swinging of the member, and a power actuator on said frame operable to move said pusher through said member into and out of engagement with an elevated piece to press the piece against and release the same from said abutment.

9. In a boring machine, the combination of, means defining a locating abutment disposed substantially in a vertical plane, a member adapted to receive and support a workpiece in a horizontal position in front of and below said abutment, means supporting said member to swing upwardly about a horizontal axis disposed alongside the upper edge of the supported workpiece adjacent the vertical plane of said abutment whereby to carry the supported piece from said horizontal position to an upright position adjacent to and spaced from said abutment as the member is swung upwardly, means rigid with and upstanding from said member alongside the supported workpiece beneath said axis to hold the piece on the member during upward swinging of the member, and a pusher movable relative to said member to press the elevated piece away from said member and against said abutment.

EARL M. BOWEN.

References Cited in the file of this patent
UNITED STATES PATENTS

| Number | Name | Date |
|---|---|---|
| 2,160,476 | Kampmeier | May 30, 1939 |
| 2,542,986 | Bowen | Feb. 27, 1951 |
| 2,577,766 | Johnson et al. | Dec. 11, 1951 |